Figure 1:
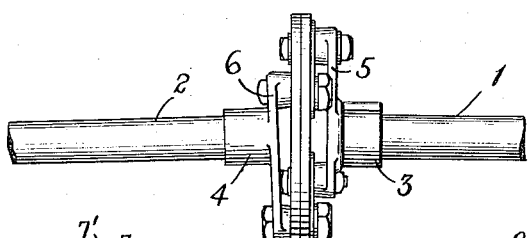

B. BRISCOE.
UNIVERSAL JOINT.
APPLICATION FILED AUG. 24, 1915.

1,204,737.

Patented Nov. 14, 1916.

WITNESSES

INVENTOR
Benjamin Briscoe
BY
ATTORNEY

UNITED STATES PATENT OFFICE.

BENJAMIN BRISCOE, OF JACKSON, MICHIGAN, ASSIGNOR TO ARGO MOTOR COMPANY, INC., OF JACKSON, MICHIGAN, A CORPORATION OF DELAWARE.

UNIVERSAL JOINT.

1,204,737.  Specification of Letters Patent.  Patented Nov. 14, 1916.

Application filed August 24, 1915. Serial No. 47,210.

*To all whom it may concern:*

Be it known that I, BENJAMIN BRISCOE, a citizen of the United States, residing at Jackson, in the county of Jackson and State of Michigan, have invented certain new and useful Improvements in Universal Joints, of which the following is a specification.

My invention relates to universal joints for connecting the adjacent ends of a driving and a driven shaft such as are used in automobiles for connecting the engine and the transmission gears. Since the engine and differential gears of an automobile are separately mounted upon the chassis, a connection must be provided whereby the shafts referred to may vibrate out of alinement with each other as the vehicle operates over a road.

The object of my invention is to provide a universal joint of the character referred to between a pair of shafts which shall be comparatively inexpensive to manufacture and assemble and shall effectively perform its function of transmitting power from one shaft to the other, while permitting a certain amount of independent movement of the two shafts as the opposite ends of the same vibrate in accordance, for example, with the "weave" of the chassis of an automobile. Accordingly, I provide a disk or transverse member of somewhat flexible material such as leather, interposed between the ends of the two shafts to be connected and connections between the adjacent ends of the two shafts and the transverse member, which connections comprise radial parts and flexible parts transverse to the radial parts, the flexible transverse connections uniting the radial parts of one connection with the radial parts of the other. The radial connections referred to may take the form of rigid metallic spiders secured to the adjacent ends of the two shafts, each spider having a plurality of radial arms, one spider being angularly displaced with respect to the other so that the arms of one spider extend in radial planes intermediate the arms of the other spider. The transverse flexible connections referred to may comprise strips or links of thin spring metal which are laid on one face of the flexible disk, each link connecting one arm of the adjacent spider with the following arm of the spider on the other side of the disk. Thus each arm of the spider on the driving disk may be secured through one end of one of the flexible links to the flexible disk and the other end of the flexible link referred to may be secured, as by a bolt passing through the link and the flexible disk, to an arm of the spider on the driven shaft. Or in place of mounting the flexible links referred to upon one face of the flexible disk only, similar links may be mounted upon both faces of the disk connecting the arms of the two spiders. Or in place of using the flexible metal links described, a spring metal ring may be mounted upon one face of the disk, or spring metal rings mounted upon both faces of the disk connecting the ends of the arms of the spiders in the same manner as described in connection with the links. By means such as described, an entirely metallic connection is made between the two shafts, power being transmitted from one shaft to the other through the spring metal transverse connecting members as a tensional stress, while at the same time the flexibility of the device is sufficient for the desired purpose.

Figure 6:
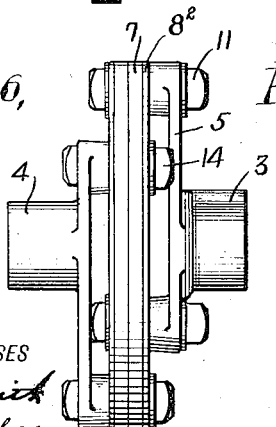
Figure 7:
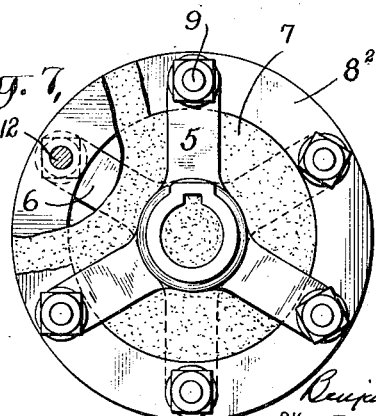

In order that a clearer understanding of my invention may be had, attention is hereby directed to the accompanying drawings forming part of this application and illustrating preferred embodiments thereof. In the drawings, Figure 1 represents an elevation of the adjacent ends of a pair of shafts connected in accordance with my invention, the shafts being shown at a slight angle to each other, Fig. 2 is a side elevation of one form of my universal joint, certain parts being shown in cross-section, Fig. 3 is a front elevation of the same, Fig. 4 is a view similar to Fig. 2, showing a modification of my invention, Fig. 5 is a front elevation of the device shown in Fig. 4, Fig. 6 is a side elevation of a further modification of my invention and Fig. 7 is a front elevation of the device shown in Fig. 6.

Referring to the drawings, the shafts 1 and 2, of which shaft 1 may be considered the driving and shaft 2 the driven element, are provided with metallic spiders 3 and 4 respectively which are received in any suitable manner to the adjacent ends of the two shafts and each of which has a plurality, preferably three, of radial arms as shown. The two spiders are preferably so mounted on the ends of the shafts that the arms 5 of spider 3 each extend in radial planes half way between the adjacent arms 6 of the spider 4. The transverse member is preferably a disk, or as shown, a pair of disks, 7, 7' of leather or other flexible material sufficiently stiff to form a good driving connection between the shafts but capable of flexing somewhat transversely.

Figure 2:
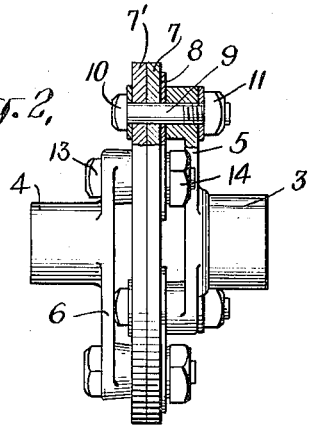
Figure 3:
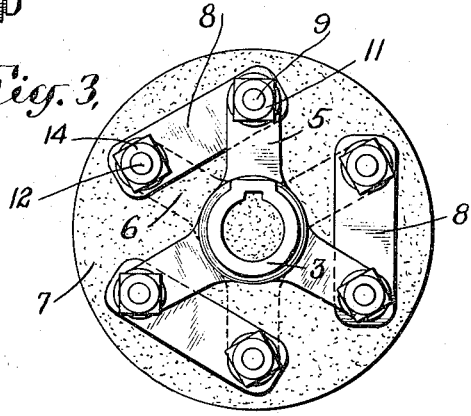

In the form of my invention illustrated in Figs. 1 to 3 of the drawings, links or strips of spring metal 8 are mounted upon one face of disk 7, such as the face adjacent to the driving shaft, these strips being the same in number as the arms of each spider. Each flexible link 8 connects the end of one arm of the driving spider with the end of the arm of the driven spider which extends to the rear of the same, the direction of rotation of the device shown in Fig. 3 being considered as clockwise. Bolts 9 extend through the ends of arms 5, links 8 and the flexible disk 7, 7', these bolts being provided with heads 10 and nuts 11. Bolts 12 extend through the ends of arms 6 of spider 4, the flexible disk, and the other ends of links 8, these bolts being provided with heads 13 and nuts 14.

Figure 4:
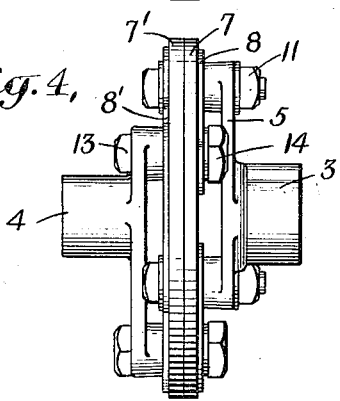
Figure 5:
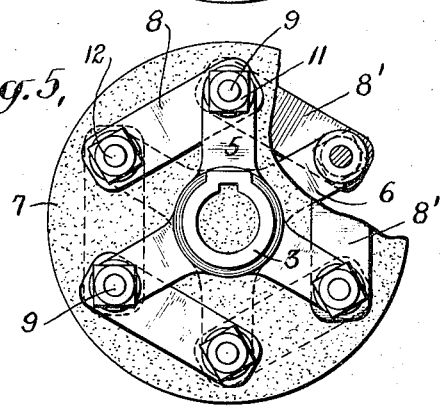

The device shown in Figs. 4 and 5 is the same as that just described, except that spring metal links or strips are mounted upon both sides of the flexible disk. As there shown, links 8 extend on one face of the disk between arms 5 of the driving spider, and arms 6 of the driven spider being secured in position by bolts 9 and 12 respectively, while links 8' extend on the other face of the disk between the arms 6 of spider 4 and the following arms 6 of spider 3, so that each bolt extends through the flexible disk and the ends of links 8, 8' on both sides of the same. With this construction there is a metallic connection between all the points of contact of the arms of the two spiders with the disk in which the strains caused by the turning of the shafts may be taken up as tension stresses in the spring metal strips.

As an alternative to the above, the strips or links 8 or links 8 and 8' may be replaced by a spring metal annulus or by a pair of spring metal rings. A construction is illustrated in Figs. 6 and 7 in which a spring metal ring 8² is used in place of strips 8 between the driving spider 3 and the flexible disk 7. As there illustrated, the ring 8² is secured in position by bolts 9 which pass through arms 5 of spider 3 and bolts 12 which extend through the flexible disk and the ring 8² from the arms 6 of spider 4 on the other side of the flexible disk.

Having now described my invention, what I claim as new therein and desire to secure by Letters Patent is as follows:

1. In a universal joint, the combination of a driving and a driven shaft, having adjacent ends, a metallic spider secured to the end of each of said shafts, each having a plurality of radial arms thereon, said spiders being angularly spaced so that the arms of one extend in planes intermediate the arms of the other, a flexible disk interposed between the said spiders, bolts extending through the ends of said arms and said disk and flexible thin metal links connecting the ends of the arms of one spider with points on the adjacent face of the disk in line with the ends of the arms of the other spider, the bolts extending through the arms of said other spider also extending through the said links, substantially as set forth.

2. In a universal joint, the combination of a driving and a driven shaft, having adjacent ends, a metallic spider secured to the end of each of said shafts, each having a plurality of radial arms thereon, said spiders being angularly spaced so that the arms of one extend in planes intermediate the arms of the other, a flexible disk interposed between the said spiders, and connections between the spiders, comprising thin flexible metal links, each extending along a face of the disk and connected at its opposite ends to the ends of an arm of the adjacent spider and of the adjacent arm of the other spider, said disk being secured to said spiders, substantially as set forth.

3. In a universal joint, the combination of a driving shaft, a driven shaft, a flexible disk interposed between the adjacent ends of the same, rigid members secured to the said ends of the said shafts, respectively, extending radially therefrom at a plurality of points, resilient connections extending upon a face of said disk from points on one of said rigid members to points on said disk, and connections through said disk from said other rigid member to said resilient connections at said last named points.

4. In a universal joint, the combination of a driving and a driven shaft, having adjacent ends, a metallic spider secured to the end of each of said shafts, each having a plurality of radial arms thereon, said spiders being angularly spaced so that the arms of one extend in planes intermediate the arms of the other, a flexible disk interposed between the said spiders, securing devices attaching the ends of the arms of said spiders to said disk, and spring metal connections between each of the arms of the driving spider and the following arms of the driven spider, secured to the securing devices of the said arms, substantially as set forth.

This specification signed and witnessed this 21st day of Aug. 1915.

BENJAMIN BRISCOE.

Witnesses:
L. E. LATTA,
FRED. MACHLIN.